(12) United States Patent
Fuller et al.

(10) Patent No.: US 6,961,395 B2
(45) Date of Patent: Nov. 1, 2005

(54) TIME VARIANT FILTER IMPLEMENTATION

(75) Inventors: Arthur T. G. Fuller, Kanata (CA); Bradley J. Morris, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 741 days.

(21) Appl. No.: 10/001,877

(22) Filed: Nov. 16, 2001

(65) Prior Publication Data

US 2003/0112904 A1 Jun. 19, 2003

(51) Int. Cl.[7] .............................................. H04B 1/10
(52) U.S. Cl. ...................................... 375/350; 375/346
(58) Field of Search ................................ 375/350, 346

(56) References Cited

U.S. PATENT DOCUMENTS

| | | | | |
|---|---|---|---|---|
| 4,896,320 A | * | 1/1990 | Gockler | 370/497 |
| 5,155,743 A | * | 10/1992 | Jacobs | 375/247 |
| 5,414,428 A | * | 5/1995 | Gallagher et al. | 342/132 |
| 5,602,762 A | * | 2/1997 | Lyon | 702/190 |
| 5,633,811 A | * | 5/1997 | Canada et al. | 702/56 |
| 5,644,592 A | | 7/1997 | Divsalar et al. | 375/206 |
| 6,014,373 A | | 1/2000 | Schilling et al. | 370/342 |
| 6,137,349 A | * | 10/2000 | Menkhoff et al. | 327/552 |
| 6,522,747 B1 | * | 2/2003 | Reilly et al. | 379/406.14 |
| 2002/0015500 A1 | * | 2/2002 | Belt et al. | 381/66 |
| 2002/0025007 A1 | * | 2/2002 | Ohashi | 375/316 |
| 2002/0051503 A1 | * | 5/2002 | Takahiko | 375/327 |
| 2002/0181630 A1 | * | 12/2002 | Mandell et al. | 375/350 |

FOREIGN PATENT DOCUMENTS

| | | | | |
|---|---|---|---|---|
| EP | 367932 A2 | * | 5/1990 | H04J/4/00 |
| EP | 530918 A2 | * | 3/1993 | H04N/9/64 |

OTHER PUBLICATIONS

Walter Kellermann, "Strategies for Combining Acousitc Echo Cancellation and Adaptive Beamforming Microphone Arrays", 1997, IEEE, 219–222.*

Fuller, Arthur et al., "3GTDD Feasibility," RF Head Study Report, Nortel Networks dabtd005—Issue BJM v0.1, Sep. 28, 2001.

Moshavi, Shimon, "Multi–User Detection for DS–CDMA Communications," IEEE Communications Magazine, pp. 124–136, Oct. 1996.

Xue, Guoqiang et al., "Adaptive Multistage Parallel Interference Cancellation for CDMA," IEEE Journal on Selected Areas in Communications, vol. 17, No. 10, pp. 1815–1827, Oct. 1999.

* cited by examiner

Primary Examiner—Stephen Chin
Assistant Examiner—Jia Lu
(74) Attorney, Agent, or Firm—Withrow & Terranova, PLLC

(57) ABSTRACT

The present invention relates to the efficient realization of a time variant multi-rate FIR filter cascaded with a time invariant FIR filter. Preferably, the time invariant FIR filter response provides filtering based on channel estimates and the time variant FIR filter provides filtering to effectively implement spreading and scrambling with appropriate coding. The realization of the combined filters is accomplished by transforming the pair of filters into a single "combined" polyphase filter with coefficients that are time variant in a specific manner. The invention provides for pre-calculating the coefficients of the combined filter; a memory storage and addressing scheme for the resulting coefficients that ensures that the combined filter behaves like the original pair of filters; and overall polyphase decomposition of the resulting filter to significantly reduce the computational complexity as compared to the requirements of the original pair of filters.

33 Claims, 12 Drawing Sheets

EXAMPLE FILTER OUTPUTS FOR FOURTH-ORDER COMBINED FILTER

| TIME INDEX $n$ | INPUT $x(n)$ | FILTER STATE 1 $x(n-1)$ | FILTER STATE 2 $x(n-2)$ | FILTER STATE 3 $x(n-3)$ | FILTER STATE 4 $x(n-4)$ | MEMORY INDEX $i$ | OUTPUT $y(n)$ |
|---|---|---|---|---|---|---|---|
| 0 | A | 0 | 0 | 0 | 0 | 0 | $A \cdot c_0(0) + 0 \cdot c_1(0) + 0 \cdot c_2(0) + 0 \cdot c_3(0) + 0 \cdot c_4(0)$ |
| 1 | B | A | 0 | 0 | 0 | 1 | $B \cdot c_0(1) + A \cdot c_1(1) + 0 \cdot c_2(1) + 0 \cdot c_3(1) + 0 \cdot c_4(1)$ |
| 2 | C | B | A | 0 | 0 | 2 | $C \cdot c_0(2) + B \cdot c_1(2) + A \cdot c_2(2) + 0 \cdot c_3(2) + 0 \cdot c_4(2)$ |
| 3 | D | C | B | A | 0 | 3 | $D \cdot c_0(3) + C \cdot c_1(3) + B \cdot c_2(3) + A \cdot c_3(3) + 0 \cdot c_4(3)$ |
| 4 | E | D | C | B | A | 4 | $E \cdot c_0(4) + D \cdot c_1(4) + C \cdot c_2(4) + B \cdot c_3(4) + A \cdot c_4(4)$ |
| 5 | F | E | D | C | B | 5 | $F \cdot c_0(5) + E \cdot c_1(5) + D \cdot c_2(5) + C \cdot c_3(5) + B \cdot c_4(5)$ |
| 6 | G | F | E | D | C | 0 | $G \cdot c_0(0) + F \cdot c_1(0) + E \cdot c_2(0) + D \cdot c_3(0) + C \cdot c_4(0)$ |
| 7 | H | G | F | E | D | 1 | $H \cdot c_0(1) + G \cdot c_1(1) + F \cdot c_2(1) + E \cdot c_3(1) + D \cdot c_4(1)$ |

FIG. 11

EXAMPLE FILTER OUTPUTS FOR FOURTH-ORDER INTERPOLATION FILTER

| TIME $n_2$ | INPUT $x(n_1)$ | INPUT $x(n_2)$ | FILTER STATE 1 $x(n_2-1)$ | FILTER STATE 2 $x(n_2-2)$ | FILTER STATE 3 $x(n_2-3)$ | FILTER STATE 4 $x(n_2-4)$ | MEMORY INDEX $i$ | OUTPUT $y(n_2)$ |
|---|---|---|---|---|---|---|---|---|
| 0 | A | A | 0 | 0 | 0 | 0 | 0 | $A \cdot c_0(0) + 0 \cdot c_1(0) + 0 \cdot c_2(0) + 0 \cdot c_3(0) + 0 \cdot c_4(0)$ |
| 1 | — | 0 | A | 0 | 0 | 0 | 1 | $0 \cdot c_0(1) + A \cdot c_1(1) + 0 \cdot c_2(1) + 0 \cdot c_3(1) + 0 \cdot c_4(1)$ |
| 2 | — | 0 | 0 | A | 0 | 0 | 2 | $0 \cdot c_0(2) + 0 \cdot c_1(2) + A \cdot c_2(2) + 0 \cdot c_3(2) + 0 \cdot c_4(2)$ |
| 3 | B | B | 0 | 0 | A | 0 | 3 | $B \cdot c_0(3) + 0 \cdot c_1(3) + 0 \cdot c_2(3) + A \cdot c_3(3) + 0 \cdot c_4(3)$ |
| 4 | — | 0 | B | 0 | 0 | A | 4 | $0 \cdot c_0(4) + B \cdot c_1(4) + 0 \cdot c_2(4) + 0 \cdot c_3(4) + A \cdot c_4(4)$ |
| 5 | — | 0 | 0 | B | 0 | 0 | 5 | $0 \cdot c_0(5) + 0 \cdot c_1(5) + B \cdot c_2(5) + 0 \cdot c_3(5) + 0 \cdot c_4(5)$ |
| 6 | C | C | 0 | 0 | B | 0 | 0 | $C \cdot c_0(0) + 0 \cdot c_1(0) + 0 \cdot c_2(0) + B \cdot c_3(0) + 0 \cdot c_4(0)$ |
| 7 | — | 0 | C | 0 | 0 | B | 1 | $0 \cdot c_0(1) + C \cdot c_1(1) + 0 \cdot c_2(1) + 0 \cdot c_3(1) + B \cdot c_4(1)$ |
| 8 | — | 0 | 0 | C | 0 | 0 | 2 | $0 \cdot c_0(2) + 0 \cdot c_1(2) + C \cdot c_2(2) + 0 \cdot c_3(2) + 0 \cdot c_4(2)$ |

*FIG. 13*

EXAMPLE FILTER OUTPUTS
FOR FOURTH-ORDER POLYPHASE INTERPOLATION FILTER

| TIME $n_2$ | INPUT $x(n_1)$ | FILTER STATE 1 $x(n_1-1)$ | SELECTED PHASE | MEMORY INDEX $i$ | OUTPUT $y(n_2)$ |
|---|---|---|---|---|---|
| 0 | A | 0 | 0 | 0 | $A \cdot c_0(0) + 0 \cdot c_3(0)$ |
| 1 | — | 0 | 1 | 1 | $A \cdot c_1(1) + 0 \cdot c_4(1)$ |
| 2 | — | 0 | 2 | 2 | $A \cdot c_2(2)$ |
| 3 | B | A | 0 | 3 | $B \cdot c_0(3) + A \cdot c_3(3)$ |
| 4 | — | A | 1 | 4 | $B \cdot c_1(4) + A \cdot c_4(4)$ |
| 5 | — | A | 2 | 5 | $B \cdot c_2(5)$ |
| 6 | C | B | 0 | 0 | $C \cdot c_0(0) + B \cdot c_3(0)$ |
| 7 | — | B | 1 | 1 | $C \cdot c_1(1) + B \cdot c_4(1)$ |
| 8 | — | B | 2 | 2 | $C \cdot c_2(2)$ |

*FIG. 15*

TIME VARIANT FILTER IMPLEMENTATION

FIELD OF THE INVENTION

The present invention relates to filtering, and in particular to implementing a time variant filter cascaded with a time invariant filter.

BACKGROUND OF THE INVENTION

In many communication applications, one is required to realize a time variant multi-rate interpolation filter followed by a time invariant filter, or a time invariant filter followed by a time variant multi-rate decimation filter. For these two filter configurations, the direct realization of the time invariant filter is computationally intensive because it operates at a higher sampling rate as compared to the sample rate of the input of the interpolation filter or the output of the decimation filter. In order to reduce the computational cost of the fixed filter, the time invariant filter can be combined with the time variant multi-rate interpolation/decimation filter in such a manner as to have the combined filter effectively operate at the lower sampling rate.

Such filtering techniques find practical application in the area of multiple access interference (MAI) mitigation. In direct sequence code-division multiple access (DS-CDMA) systems, MAI is a factor that contributes to a limitation in system capacity and performance. In an attempt to reduce the effect of this factor, one can employ some form of multi-user detection (MUD) algorithm. The basis of a typical MUD detector is the application of information known about other users to improve detection of each individual user.

Of particular interest is the class of MUD detectors known as subtractive interference cancellation detectors. The fundamental principle behind these detectors is that an estimate is made of each individual user's contribution to the total MAI and then subtracted out from the received signal such that the MAI affecting each individual user is reduced. Typically, the detection process is carried out in an iterative manner, where the data decisions of the previous iteration are used as the basis for the next iteration's MAI estimates.

For a chip-rate interference cancellation detector, the process of calculating each individual's contribution to the total MAI involves "regenerating" chip-rate samples from symbol rate data estimates. As an example, for the time division duplex (TDD) mode of a Universal Mobile Telecommunications System terrestrial radio access (UTRA) communication system, regeneration for a given user involves: spreading by the user's corresponding real channelization code, scrambling with a cell-specific complex code, and filtering with the user's channel estimate, which typically requires 28 to 64 complex taps. Note that the spreading codes generally vary in length from 1 to 16. However, the cell-specific scrambling code usually has a fixed length of 16. Therefore, if spreading and scrambling are combined into a single function, the result is effectively a time variant multi-rate interpolation filter. In this way, the regeneration process can be considered as a time variant multi-rate interpolation filter cascaded with a time invariant filter.

Given that regeneration is performed on a per cancellation iteration basis for each user, the computational cost of regeneration is substantial. As such, there is a need to reduce the computational cost of regeneration without degrading the accuracy of the regenerated results. Conventionally, regeneration is accomplished by first performing channelization in the traditional manner, such as by effecting a single, time variant complex multiplication at the chip rate. Finite impulse response (FIR) filters, whose complex coefficients are given by each user's corresponding channel estimate, follow. Since these FIR filters are operating at the chip-rate, the computational requirements are very high.

As an example, consider a TDD mode UTRA system with eight active users and channel estimates with 57 complex taps. The total computational cost of regeneration would be 464 complex calculations per chip-rate period, per cancellation iteration. Assuming that interference cancellation uses four cancellation iterations per TDD slot period (equivalent to 2560 chip-rate periods or 667 microseconds), this corresponds to a computational requirement of 7.2 billion complex operations per second. An alternative technique that has been proposed involves the cancellation of interference at the symbol-rate as opposed to the chip-rate. This approach eliminates the need for chip-rate regeneration, but also may result in a reduction in the accuracy of the MAI estimates.

Accordingly, there is a need for efficient realization of a time variant multi-rate interpolation, or decimation FIR filter, cascaded with a time invariant FIR filter.

SUMMARY OF THE INVENTION

The present invention provides efficient realization of a time variant multi-rate FIR filter cascaded with a time invariant FIR filter. Preferably, the time invariant FIR filter response provides filtering based on channel estimates and the time variant FIR filter provides filtering to effectively implement spreading and scrambling with appropriate coding. The realization of the combined filters is accomplished by transforming the pair of filters into a single "combined" polyphase filter with coefficients that are time variant in a specific manner. The invention provides for pre-calculating the coefficients of the combined filter; a memory storage and addressing scheme for the resulting coefficients that ensures that the combined filter behaves like the original pair of filters; and overall polyphase decomposition of the resulting filter to significantly reduce the computational complexity as compared to the requirements of the original pair of filters.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 11 is a table of example filter outputs for a fourth-order combined filter.

FIG. 13 is a table of example filter outputs for a fourth-order interpolation by three filter.

FIG. 15 is a table of example filter outputs for a fourth-order polyphase interpolation by three filter.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to the efficient realization of a time variant multi-rate finite impulse response (FIR) filter cascaded with a time invariant multi-rate FIR filter, the overall result of which could implement interpolation, decimation, or a combination thereof. This is accomplished by transforming the pair of filters into a single "combined" polyphase filter with coefficients that are time variant in a specific manner. The invention provides for pre-calculating the coefficients of the combined filter; a memory storage and addressing scheme for the resulting coefficients that ensures that the combined filter behaves like the original pair of filters; and overall polyphase decomposition of the resulting filter to significantly reduce the computational complexity as compared to the requirements of the original pair of filters. In the preferred embodiment, the invention finds practical application in the efficient calculation and estimation of multiple access interference (MAI) in an interference cancellation detector for direct-sequence code-division multiple access (DS-CDMA) communication systems. Those skilled in the art will recognize other applications of the invention. The following description initially defines the operating environment of the present invention.

Figure 1:
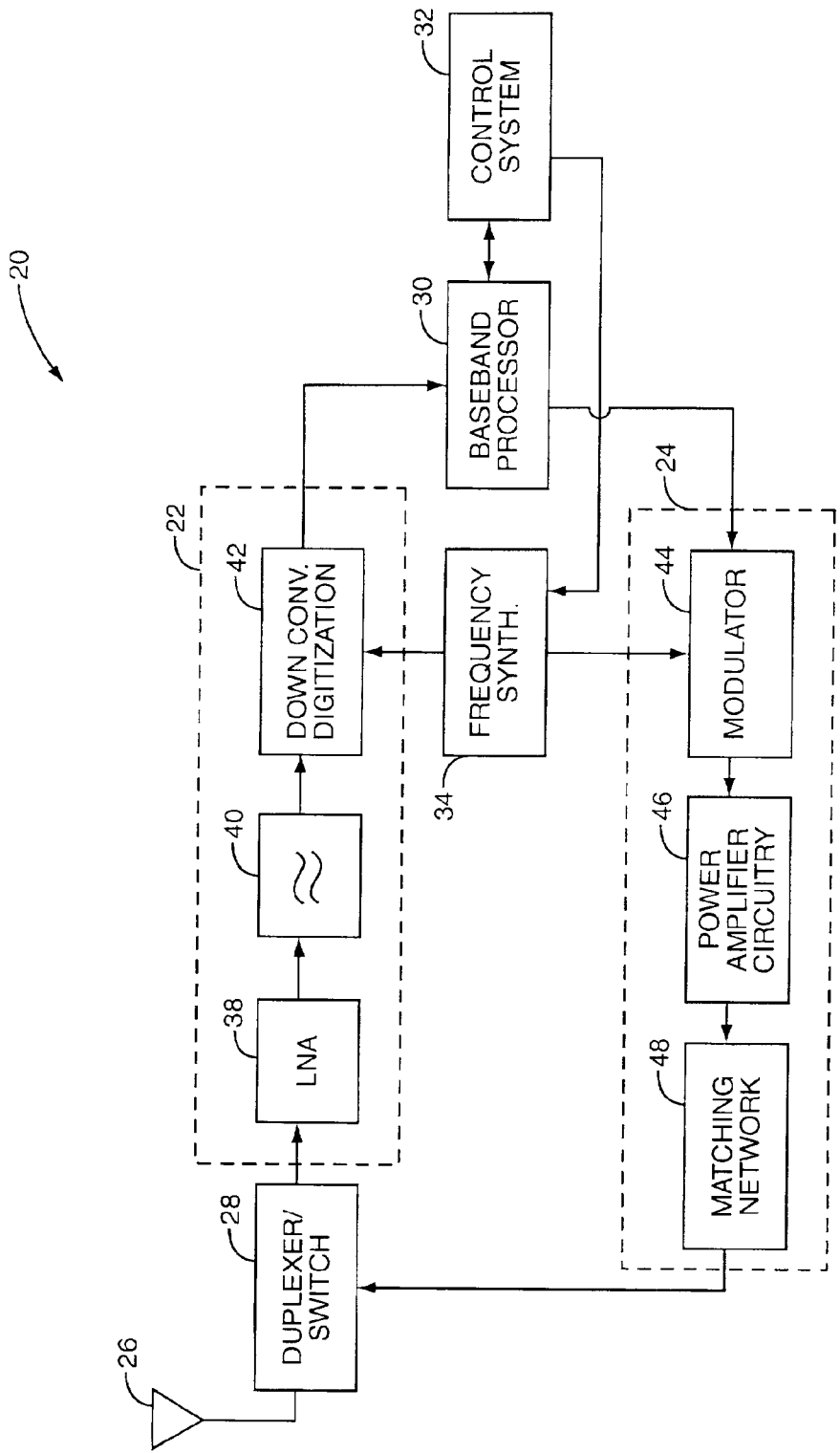
FIG. 1 is a schematic representation of a base station transceiver configured according to one embodiment of the present invention.

The present invention may be incorporated in a base station transceiver 20. The basic architecture of a base station transceiver 20 is represented in FIG. 1 and may include a receiver front end 22, a radio frequency transmitter section 24, an antenna 26, a duplexer or switch 28, a baseband processor 30, a control system 32, and a frequency synthesizer 34. The receiver front end 22 receives information bearing radio frequency signals from one or more remote transmitters provided by a terminal, such as a mobile telephone, wireless personal digital assistant, or like communication device. A low noise amplifier 38 amplifies the signal. A filter circuit 40 minimizes broadband interference in the received signal, while downconversion and digitization circuitry 42 downconverts the filtered, received signal to an intermediate or baseband frequency signal, which is then digitized into one or more digital streams. The receiver front end 22 typically uses one or more mixing frequencies generated by the frequency synthesizer 34.

The baseband processor 30 processes the digitized received signal to extract the information or data bits conveyed in the received signal. This processing typically comprises demodulation, decoding, error correction, and inference cancellation operations. As such, the baseband processor 30 is generally implemented in one or more digital signal processors (DSPs), application specific intergrated circuits (ASICs), or field programmable gate arrays (FPGAs). Further detail regarding the operation of the baseband processor 30 is provided below. On the transmit side, the baseband processor 30 receives digitized data, which may represent voice, data, or control information, from the control system 32, which it encodes for transmission. The encoded data is output to the transmitter 24, where it is used by a modulator 44 to modulate a carrier signal that is at a desired transmit frequency. Power amplifier circuitry 46 amplifies the modulated carrier signal to a level appropriate for transmission, and delivers the modulated carrier signal to antenna 26 through a matching network 48.

In a typical parallel interference cancellation (PIC) system addressing MAI, the input signal is composed of multiple (M) user signals separated by orthogonal codes. For a specific time period, or slot, the input signal is separated into M individual signals corresponding to each of the multiple users and demodulated to recover K symbols for each of the M individual signals. In a "regeneration" process, the respective K symbols for the M users are remodulated using the appropriate spreading and scrambling coding and filtered using channel estimates to create M regenerated signals. For each user, the regenerated signals for the other M-1 users are subtracted from the original input signal to form M new individual signals. This last step is repeated for each user to create M individual signals for each of the M users.

These new individual signals are individually demodulated and reprocessed, ideally with higher reliability than in the previous step, for as many iterations as desired. The output of the last iteration is used to form the final symbol decisions from the each of the M user signals. A survey of interference cancellation techniques for CDMA is given in S. Moshavi, "Multi-User Detection for DS-CDMA Communications," IEEE Communications Magazine, October 1996, pp. 124–136, which is incorporated herein by reference.

Figure 2:
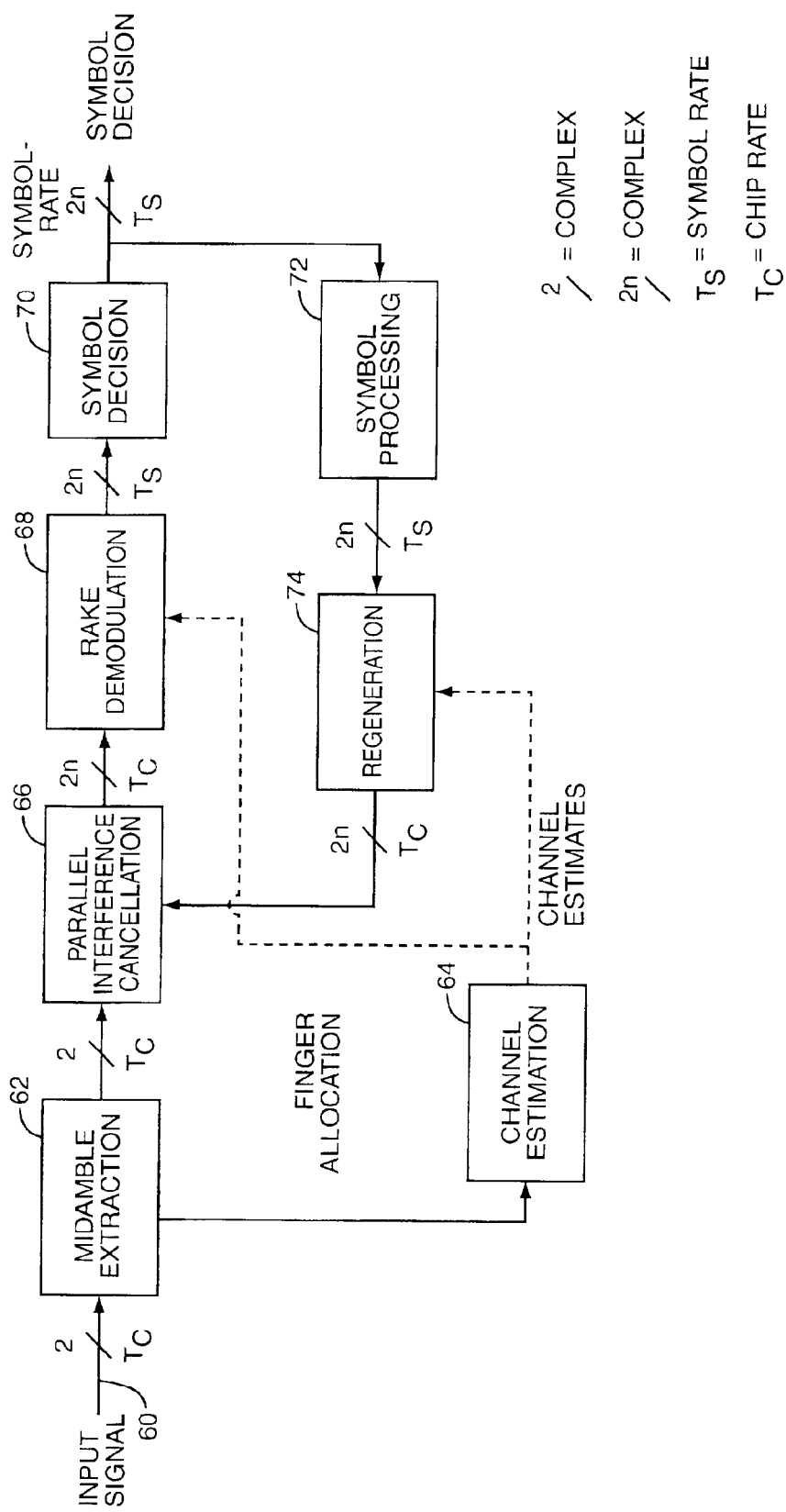
FIG. 2 is a schematic representation of multiple access interference cancellation circuitry according to one embodiment of the present invention.

The architecture representative of PIC detector circuitry for one embodiment of the present invention is illustrated in FIG. 2. This particular variant of PIC is referred to as "chip-level" PIC due to the fact that interference is cancelled at the chip-rate. While chip-rate cancellation is computationally intensive, it leads to a simple data path-oriented structure that remains relatively constant regardless of the given number of users and spreading factor combinations.

The baseband processor 30 will preferably include the circuitry and software to implement the following structure or functionality. Those skilled in the art will recognize the numerous alternatives to the specifically disclosed structure and function. In general, the following functions are provided in hardware, software, or a combination thereof: midamble extraction 62, channel estimation 64, parallel interference cancellation 66, rake demodulation 68, symbol decision 70, symbol processing 72, and signal regeneration 74. Signal regeneration 74 is significantly enhanced by the present invention.

For the disclosed embodiment, it is assumed that a single chip-rate PIC application specific integrated circuit (ASIC) is used to process all users for a single antenna. Moreover, it is assumed that the over-sampled, received signal is decimated to the chip-rate so that the input signal 60 is a composite signal represented by chip-rate complex samples. It is also assumed that channel estimation and other required pre-calculations occur during the reception of the second data field for a given time slot, and the processing of all data symbols for a given time slot occurs during the reception of data for the next time slot. Those skilled in the art will recognize equivalent implementation as those specifically described herein.

Initially, the midamble extraction function 62 extracts the midamble from the received input signal 60 for a given slot, and a channel estimate is obtained for each user from the channel estimation function 64 in traditional fashion. The channel estimates may be used for chip-rate finger allocation in the constituent rake demodulator 68 and used to directly or indirectly define the filter coefficients for the regeneration function 74. Channel estimation may be accomplished using a "fast" cyclic correlator and additional processing to enhance the accuracy of the result.

Upon reception, the PIC function 66 is bypassed and rake demodulation 68 separates the composite input signal 66 into M individual signals corresponding to the respective signals for each user. To determine the individual signals for each user during subsequent iterations, the PIC function 66 subtracts the regenerated signals corresponding to all other individual signals from the composite input signal 66 for the given time slot. The regenerated signals for each user are fed back via the regeneration and symbol processing functions 74, 72.

As noted, rake demodulation 68 is used to demodulate each individual user's signal from the composite input signal 60. Demodulation may include despreading each individual signal with a unique channelization code and descrambling all individual signals using the base station's descrambling code. This operation is preferably performed at the chip-rate, producing a complex, symbol-rate output. Symbol estimates for each user are determined by applying the symbol decision function 70 to the outputs of the rake demodulator 68 in traditional fashion. The symbol decision function 70 may be implemented in hardware using symbol detection circuitry.

Symbol processing 72 may be performed on the symbol estimates in order to enhance cancellation performance. A preferred method of processing symbols is provided in U.S. patent application Ser. No. 09/998,564, filed Nov. 16, 2001 and published as U.S. Patent Publication No. 2003/0095590, entitled SYMBOL-DIRECTED WEIGHTING IN PARALLEL INTERFERENCE CANCELLATION. The symbol processing 72 in the preferred method effectively provides a weighting for the latest symbol decision based on the consistency of previous estimates for the given symbol in earlier iterations. The symbol processing 72 provides individually weighted symbol estimates for each symbol based on the weighting and symbol estimate.

The regeneration function 74 essentially recreates estimates of the individual signals from the detected symbols, or weighted symbol estimates if such processing is used, for each of the estimated users. Accordingly, regeneration will typically involve processing to effectively:

spread the symbols weighted with the user's specific channelization or spreading code, scramble the spread signal with a base station's complex code, and filter the spread and scrambled signal with the user's channel estimates.

The output of the regeneration function 74 provides estimates for each of the individual contributions to the composite received signal received for each user. As described in detail below, the present invention reduces the computational complexity of the regeneration operation without introducing any error. Each of the regenerated signals is individually sent to the PIC function 66 to effect the iterative MAI cancellation.

For the regeneration function 74, the present invention efficiently cascades a time variant FIR filter and a time invariant FIR filter and effects a polyphase decomposition of the result. The polyphase decomposition leads to a reduction in complexity because the resulting polyphase filter can effectively operate at a lower sampling rate.

In essence, the invention combines a time variant filter and time invariant filter into one time variant polyphase filter that provides the same transfer function as separately implemented filters. The present invention is not limited to regeneration in a PIC environment and can be used for filter applications that match the general configurations of FIGS. 3 and 5. Further, the ordering of the filters being combined may be changed and the filters may be implemented in interpolation and decimation embodiments. In general, the invention includes:

a pre-calculation technique for generating all possible coefficients of the combined time variant polyphase filter;

a memory storage and addressing scheme for the resulting filter coefficients such that the appropriate transfer function is maintained; and overall polyphase decomposition of the resulting filter to reduce the computational complexity.

Figure 3:
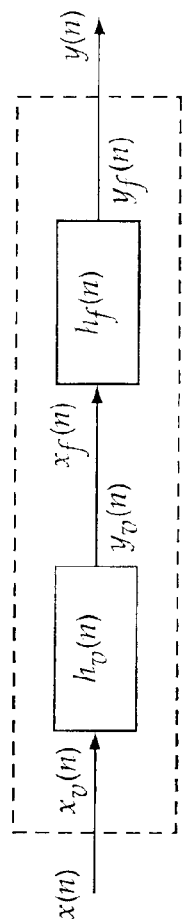
FIG. 3 is a schematic representation of a time variant filter preceding a time invariant filter.

The particular technique for combing the two FIR filters and the associated pre-calculation and storage of the resulting coefficient differs depending on whether the time variant filter is effectively implemented before or after the time invariant filter. FIG. 3 illustrates a time variant filter $h_v(n)$ preceding a time invariant filter $h_f(n)$. Let the input-output relationship of the time variant filter $h_v(n)$ be $$y_v(n) = \sum_{k=0}^{N_v} a_k(n) x_v(n-k) \qquad \text{Eq. 1}$$

and the input-output relationship of the time invariant filter $h_f(n)$ be $$y_f(n) = \sum_{i=0}^{N_f} b_i x_f(n-i) \qquad \text{Eq. 2}$$

where $N_v$ and $N_f$ are the orders of the time variant and time invariant FIR filters, respectively. From Eq. 1 and Eq. 2, the input-output relationship of the combined filter in FIG. 3 can be reduced to $$y(n) = \sum_{m=0}^{N_v+N_f} \left( \sum_{\substack{i=0 \\ i+k=m}}^{N_f} \sum_{k=0}^{N_v} b_i a_k(n-i) \right) x(n-m). \qquad \text{Eq. 3}$$

Then, one can simplify Eq. 3 in accordance with $$y(n) = \sum_{m=0}^{N_v+N_f} c_m(n) x(n-m), \qquad \text{Eq. 4}$$

which has time variant coefficients $c_m(n)$ given by $$c_m(n) = \sum_{k=\max(0,m-N_f)}^{\min(m,N_v)} a(n-m+k) b_{m-k}. \qquad \text{Eq. 5}$$

In this way, one obtains a single combined time variant filter. Based on Eq. 5, the combined filter coefficients $c_m(n)(m \in (0, N_v+N_f))$ are not only a function of the different coefficients of the time variant filter, but also a function of these coefficients at different points in time. Therefore, even if all coefficients of the time variant filter change at the same time, future values of $c_m(n)$ will be affected by this change. As such, it takes time for the coefficient changes to "ripple" through and affect all of the combined filter coefficients. If certain assumptions are made about the characteristics of the time variant filter coefficients $a_k(n)$, then a simplified architecture for the resulting combined filter may be created. These assumptions are as follows: a) there are R sets of unique values for the variable coefficients $a_k(n)$, and b) the values of $a_k(n)$ are changed at the same time every P sample periods. If these assumptions hold, the resulting unique values of $c_m(n)$ will be finite and will change in a periodic fashion. The period of this variation is given by $$T_{VARIATION} = R*P. \qquad \text{Eq. 6}$$

Note that for a given m, the number of unique values for $c_m(n)$ will be less than or equal to $T_{VARIATION}$, depending on the values of m, R, P, $N_v$, and $N_f$.

Using these results, one can obtain a simplified memory architecture for the hardware realization of the combined filter. Coefficient values are stored in a memory array with $T_{VARIATION}$ rows and $N_v+N_f+1$ columns. Each combined filter coefficient $c_m(n)(m \in (0, N_v+N_f))$ is allocated a corresponding column in this memory array. The values of $c_m(n)$ are pre-calculated in accordance with Eq. 5, taking into account the possible values for $a_k(n)$, and stored in the corresponding column. Note that in order for the set of coefficient values for a given sample period to be contained in the same row, the values of $c_m(n)$ must be calculated and stored in a specific manner. An example of an algorithm for combined coefficient calculation follows.

Algorithm 1

```
//Initialize memory array
for m = 0 to N_v + N_f
    for j = 0 to T_VARIATION - 1
        c_m (j) = 0
    end
end
//Perform combined coefficient calculation
for m = 0 to N_v + N_f
    for k = max (0, m - N_f) to min (m, N_v)
        index = mod (m-k, T_variation)
        for i = 0 to R - 1
            for j = 0 to P - 1
                c_m (index) = c_m (index) + a_k (i*P) *b_{m-k}
                index = mod (index + 1, T_VARIATION)
            end
        end
    end
end
```

Figure 4:
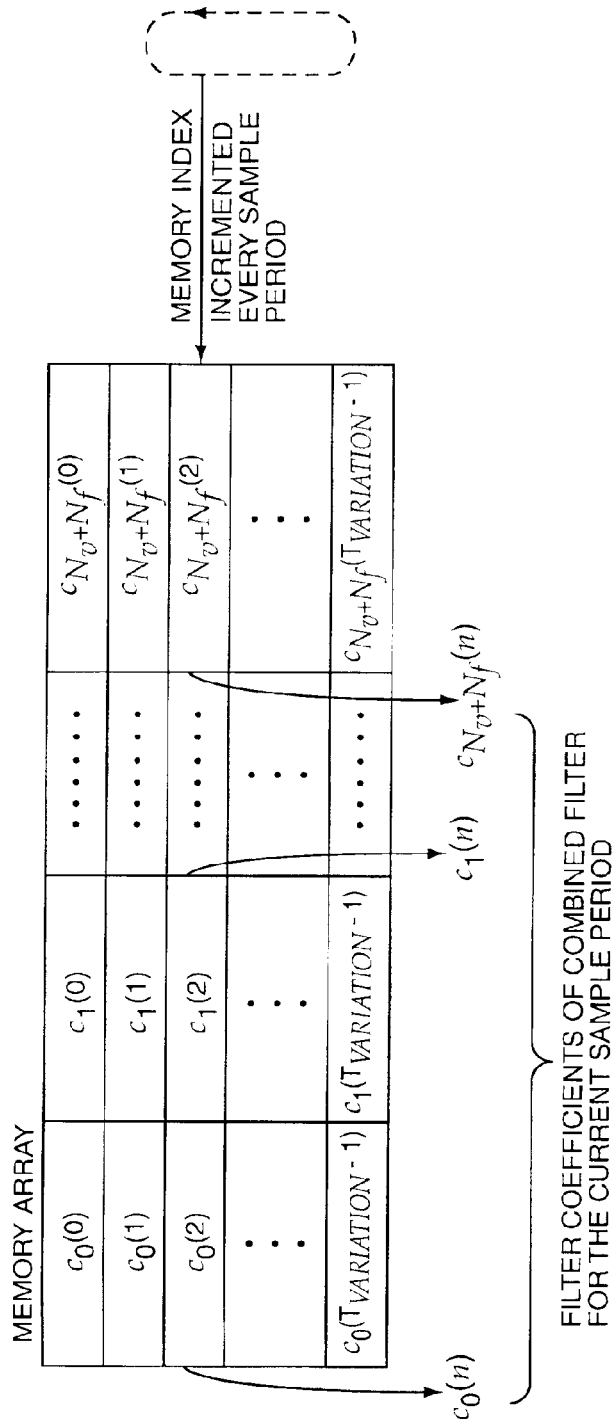
FIG. 4 is an illustrative memory architecture of combined time variant and time invariant filters for the architecture illustrated in FIG. 3.

Using such an algorithm allows one to use a common memory index in order to select the coefficient values of the combined filter for a given sample period. During normal operation of the combined filter, the memory index is initialized to row 0 and incremented by one row (modulo $T_{VARIATION}$) every sample period. A graphical depiction of the memory architecture of the resulting filter is given in FIG. 4. Once the combined filter has been obtained, one can then perform a conventional polyphase decomposition of the result in order to realize the computational savings.

Figure 5:
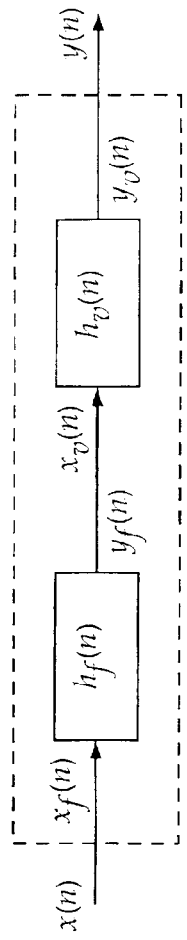
FIG. 5 is a schematic representation of a time variant filter following a time invariant filter.

FIG. 5 illustrates a time variant filter $h_v(n)$ following a time invariant filter $h_f(n)$. As described above, let the transfer function of the time variant filter $h_v(n)$ be represented by Eq. 1 and the transfer function of the time invariant filter $h_f(n)$ be represented by Eq. 2. From Eq. 1 and Eq. 2, the transfer function of the combined filter in FIG. 5 can be represented as $$y(n) = \sum_{m=0}^{N_v+N_f} \left( \sum_{\substack{k=0 \\ i+k=m}}^{N_v} \sum_{i=0}^{N_f} b_i a_k(n) \right) x(n-m). \qquad \text{Eq. 7}$$

Then, one can simplify Eq. 7 in accordance with $$y(n) = \sum_{m=0}^{N_v+N_f} c_m(n) x(n-m), \qquad \text{Eq. 8}$$

which has time variant coefficients $c_m(n)$ given by $$c_m(n) = \sum_{k=\max(0,m-N_f)}^{\min(m,N_v)} a_k(n) b_{m-k}. \qquad \text{Eq. 9}$$

In this way, one obtains a single combined time variant filter. From Eq. 9, it can be seen that the combined filter coefficients $c_m(n)(m \in (0, N_v+N_f))$ are only a function of the different coefficients of the time variant filter at the same time instant. Therefore, if all coefficients of the time variant filter change at the same time, all values of $c_m(n)$ will be immediately affected by this change. Accordingly, changes in coefficients occur immediately and do not take time to "ripple" through the memory to affect all of the combined filter coefficients.

As before, if certain assumptions are made about the characteristics of the time variant filter coefficients $a_k(n)$, then a simplified architecture for the resulting combined filter may be created. These assumptions are as follows: a) there are R sets of unique values for the variable coefficients $a_k(n)$, and b) the values of $a_k(n)$ are changed at the same time every P sample periods. If these assumptions hold, the resulting unique values of $c_m(n)$ will be finite and will change in a periodic fashion with a period given by Eq. 6.

Given that changes to $a_k(n)$ immediately affect all coefficient values $c_m(n)$, the number of unique values for each combined coefficient is exactly R. Using these results, one can obtain a simplified memory architecture for the hardware realization of the combined filter. Coefficient values are stored in a memory array with R rows and $N_v+N_f+1$ columns. Each combined filter coefficient $c_m(n)(m\epsilon(0,N_v+N_f))$ is allocated a corresponding column in this memory array (R memory locations). The values of coefficients $c_m(n)$ are pre-calculated in accordance with Eq. 9, taking into account the possible values for $a_k(n)$, and stored in the corresponding column. An example of an algorithm for combined coefficient calculation for this case follows.

Algorithm 2

```
//Initialize memory array
for m = 0 to N_v + N_f
    for j = 0 to R - 1
        c_m (j) = 0
    end
end
//Perform combined coefficient calculation
for m = 0 to N_v + N_f
    for k = max (0, m - N_f) to min (m, N_v)
        for i = 0 to R - 1
            c_m (i) = c_m (i) + a_k (i * P) * b_{m-k}
        end
    end
end
```

Figure 6:
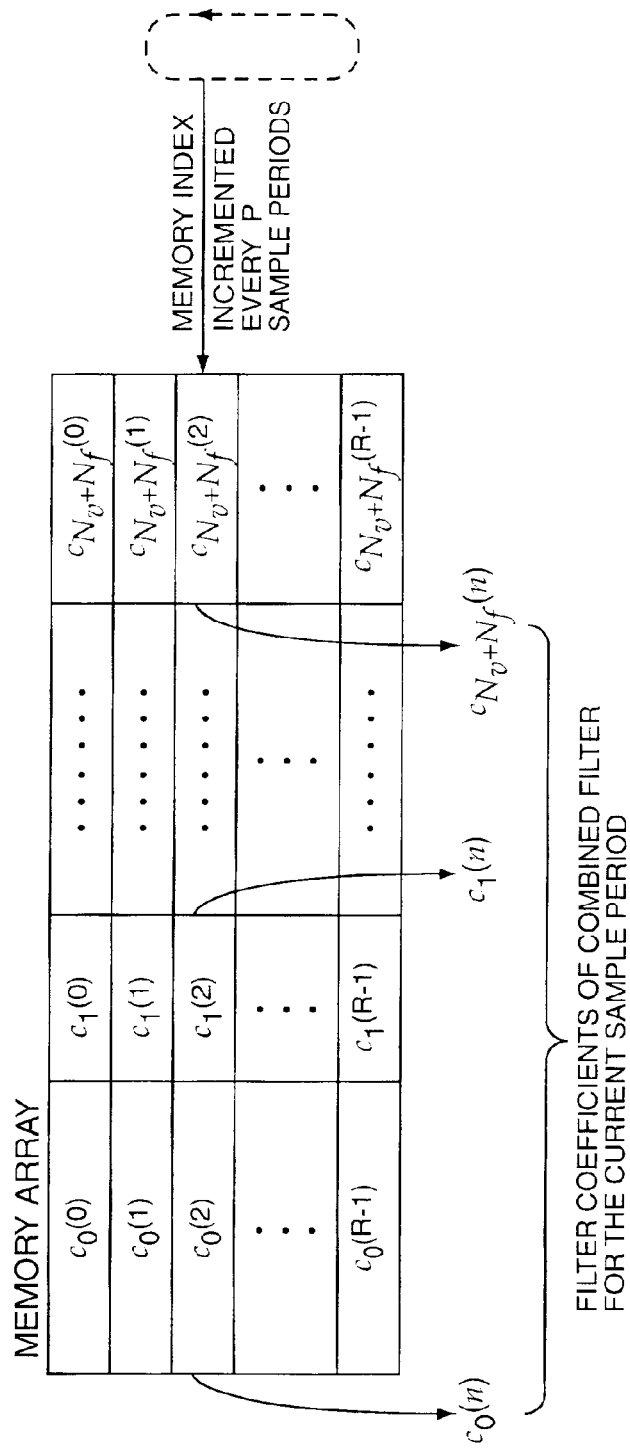
FIG. 6 is an illustrative memory architecture of combined time variant and time invariant filters for the architecture illustrated in FIG. 5.

In this way, a common memory index can be used to select the coefficient values of the combined filter for a given sample period. During normal operation of the combined filter, this memory index is initialized to row 0 and incremented by one row (modulo R) every P sample periods. A graphical depiction of the memory architecture for the resulting filter is given in FIG. 6. Once the combined filter has been obtained, one can then perform a conventional polyphase decomposition of the result in order to realize the computational savings.

Polyphase decomposition corresponds to a partitioning of the overall combined time variant filter into a set of "sub-filters" arranged in a specific manner. The coefficient values for these sub-filters are directly obtained from the current row, as indicated by the memory index, in the pre-calculated coefficient memory array. The resulting filter structures are given in FIG. 7 and FIG. 8, for the case of a time variant interpolation filter and a time variant decimation filter, respectively. The up and down arrows represent upsampling and downsampling by the associated factor.

The input/output relationships of the constituent FIR sub-filters $e_l(n)$ are given by $$y_l(n) = \sum_{m=0}^{\left\lceil \frac{N_v+N_f+1-l}{L} \right\rceil} c_{mL+l}(n)x_l(n-m) \quad \text{Eq. 10}$$

where L is the rate change factor, where $c_{mL+l}(n)$ are the coefficients obtained from the memory array as described above, and where $x_l(n)$ and $y_l(n)$ are the inputs and outputs of the sub-filter $e_l(n)$, respectively. In this way, one obtains an overall input/output relationship that is identical to that of the original cascaded time variant and time invariant filters, but the computations occur at the lower sampling rate, thus reducing the computational cost by a factor of L. Further information relating to polyphase decomposition can be found in Vaidyanathan, P. P., Multirate Systems and Filter Banks, P T R Prentice-Hall Inc., Englewood Cliffs, N.J., 1993, which is incorporated herein by reference.

Figure 9:
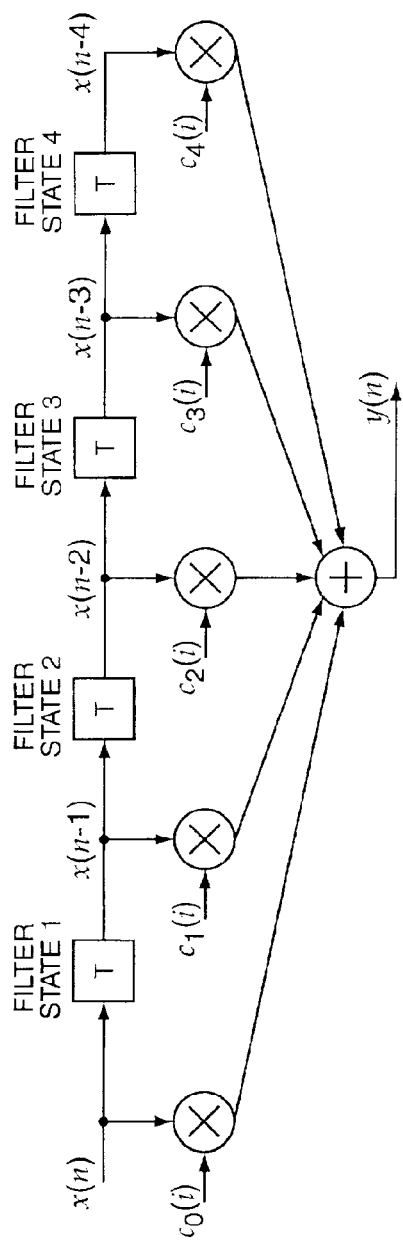
FIG. 9 is a representation of a fourth-order combined filter.

As an example, consider a fourth-order combined filter with an input/output relationship given by $$y(n)=c_0(i)x(n)+c_1(i)x(n-1)+c_2(i)x(n-2)+c_3(i)x(n-3)+c_4(i)x(n-4) \quad \text{Eq. 11}$$

where i is the index used to address the pre-calculated coefficient memory array, where $c_0(i)$, $c_1(i)$, $c_2(i)$, $c_3(i)$, and $c_4(i)$ are the pre-calculated coefficients of the combined filter stored in the memory array, and where $x(n)$ and $y(n)$ are the input and output of the combined filter, respectively. One possible realization of Eq. 11 is given in FIG. 9.

Figure 10:
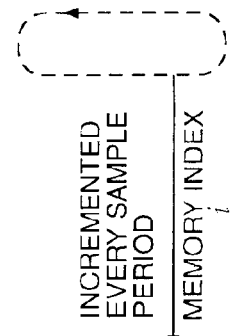
FIG. 10 is an illustrative memory array for a fourth-order filter.

For this example, it is assumed that time variant filter precedes the fixed filter. Moreover, it assumed that $T_{VARIATION}=6$ (normally obtained from Eq. 6). Therefore, the combined filter coefficients $c_m(n)(m\epsilon(0,4))$ are calculated in accordance with Eq. 5 and the associated algorithm 1 provided above, and the results are stored in a memory array as shown in FIG. 10. In this way, the corresponding filter outputs can be obtained as given in the table of FIG. 11.

Figure 12:
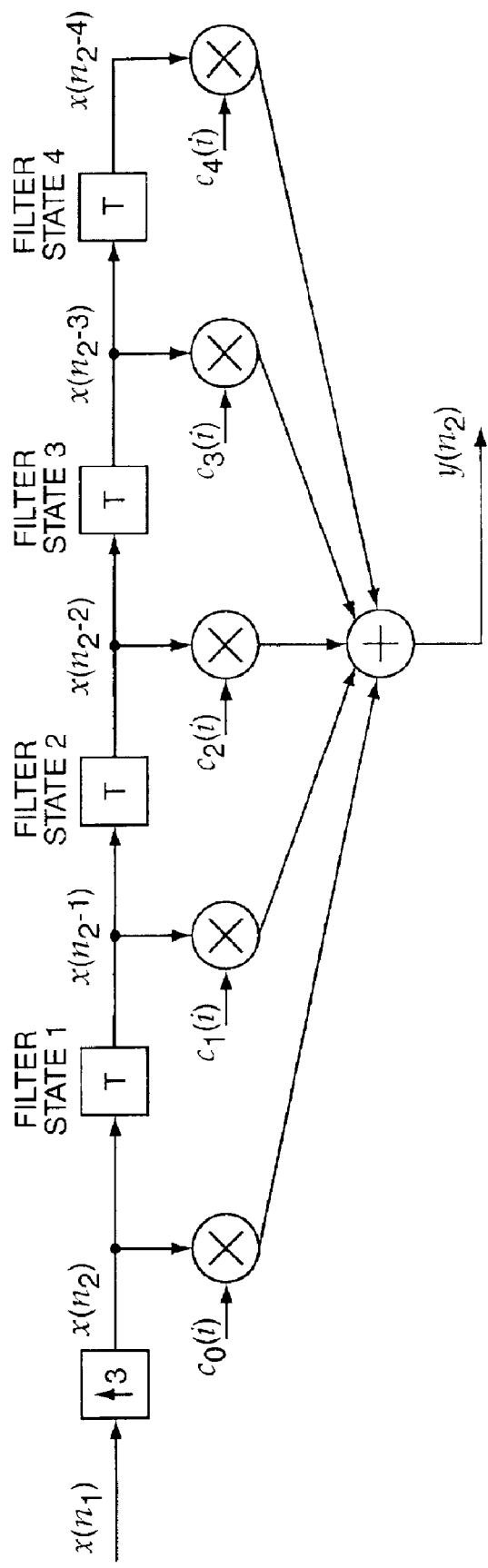
FIG. 12 is a representation of a fourth-order interpolation by three filter.

Next, consider the filter in the above example when used as an interpolation filter. One possible realization of the combined interpolation filter is given in FIG. 12. Note that the sample rate of the input $x(n_2)$ is a factor of three higher than that of the input $x(n_1)$. As in the example above, it is assumed that the time variant filter precedes the fixed filter. Therefore, the combined filter coefficients $c_m(n)(m\epsilon(0,4))$ are calculated in accordance with Eq. 5 and Algorithm 1, and the results are stored in a memory array as shown in FIG. 10. In this way, the corresponding filter outputs can be obtained as given in the table in FIG. 13. Notably, the computational load is increased significantly because each of the additional samples added to facilitate the upsampling results in extra calculations. However, since the added sample values are zero, these calculations are unnecessary. The result is a significant, but unnecessary, increase in computational load.

Figure 14:
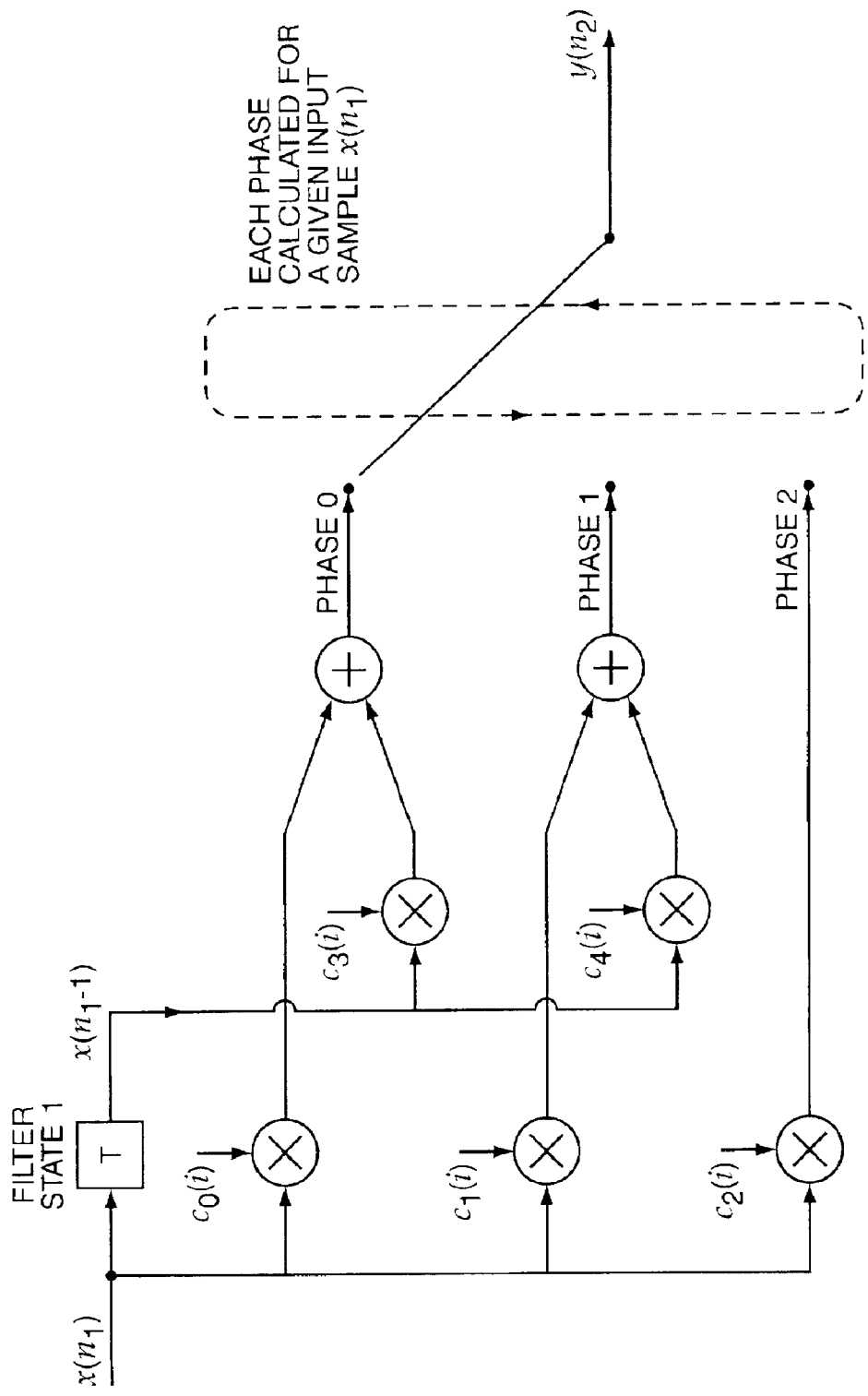
FIG. 14 is a representation of a fourth-order polyphase interpolation by three filter.

Finally, consider the use of polyphase decomposition of the interpolation filter in the above example as realized in FIG. 14. The sample rate of the output $y(n_2)$ is a factor of three higher than that of the input $x(n_1)$. In essence, the number of phases is equal to the upsampling factor. The output $y(n_2)$ is cycled through each phase output for each input $x(n_1)$. Accordingly, the output $y(n_2)$ is effectively upsampled. As in the previous examples, it is assumed that the time variant filter precedes the fixed filter. Therefore, the combined filter coefficients $c_m(n)(m\epsilon(0,4))$ are calculated in accordance with Eq. 5 and Algorithm 1, and the results stored in a memory array as shown in FIG. 10. In this way, the corresponding filter outputs can be obtained as given in the table of FIG. 15.

Note that the polyphase decomposition of the interpolation filter generates outputs that are identical to those of the original interpolation filter. Reference is made to FIGS. 13 and 15. However, there has been a threefold reduction in computational complexity in the polyphase filter, because the adder and multiplier units operate at the lower sampling rate and the zero values associated with the upsampling are not computed.

The following outlines the significant reduction in processing provided for the present invention as compared with alternative techniques. For implementing the regeneration function 74 in a code division multiple access (CDMA) time division duplex (TDD) system, the following processes are required:

spreading the symbol estimates with a real-valued, user specific code (length 1–16);

scrambling the (spread) symbol estimates with a complex-valued, cell specific code (length 16); and filtering the spread and scrambled symbol estimates by a channel estimate (28–64 complex taps).

Figure 16:
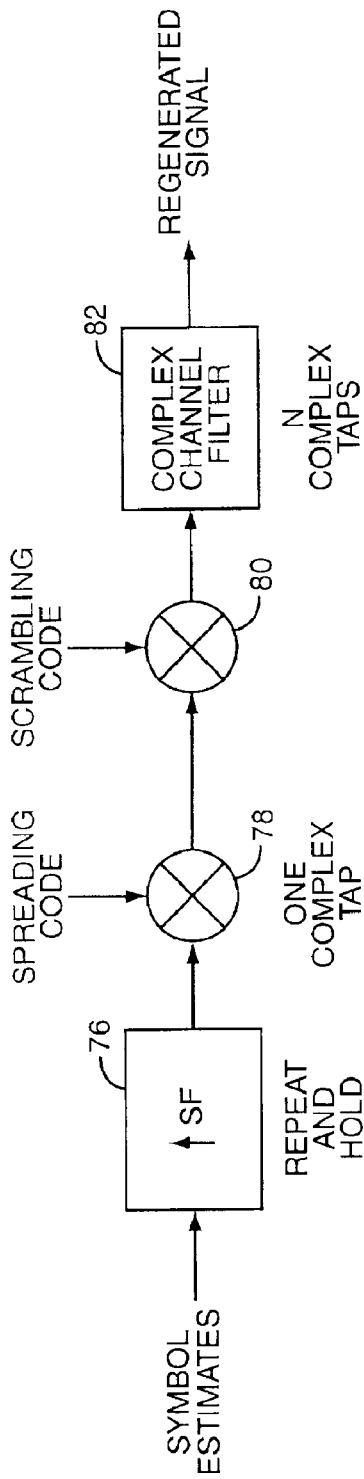
FIG. 16 is a representation of a regeneration process including spreading and scrambling functions implemented in hardware.
Figure 17:
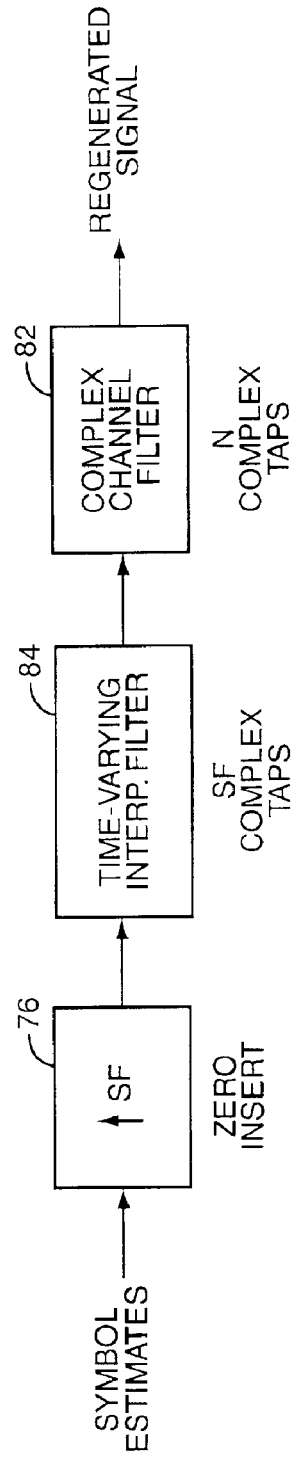
FIG. 17 is a representation of a regeneration process including spreading and scrambling functions implemented using a time variant filter.

A graphical representation of a traditional regeneration function is provided in FIG. 16, wherein the symbol estimates are upsampled by a spreading factor (SF) using upsampling circuitry 76; mixed with the appropriate spreading and a scrambling codes using mixers 78 and 80; and filtered with channel estimates to provide a regenerated signal using a complex channel filter 82. Alternatively, the spreading and scrambling process can by represented as a multi-rate interpolation filter 84 with time variant coefficients as illustrated in FIG. 17. Thus, one embodiment of the present invention effectively combines the multi-rate interpolation filter 84 with the channel filter 82 as illustrated in FIG. 7.

Assume for the purposes of regeneration that there are eight users, the spreading code has a spreading factor of eight, and channel estimates have a length equal to 57. The embodiment of FIG. 16 would require 73 complex words of memory for coefficients and spreading/scrambling codes per user and 58 complex multiply accumulates (CMACs) per chip-rate period, per user, per cancellation iteration. For four cancellation iterations, this corresponds to a computational requirement of 7.2 billion CMACs per second.

Figure 7:
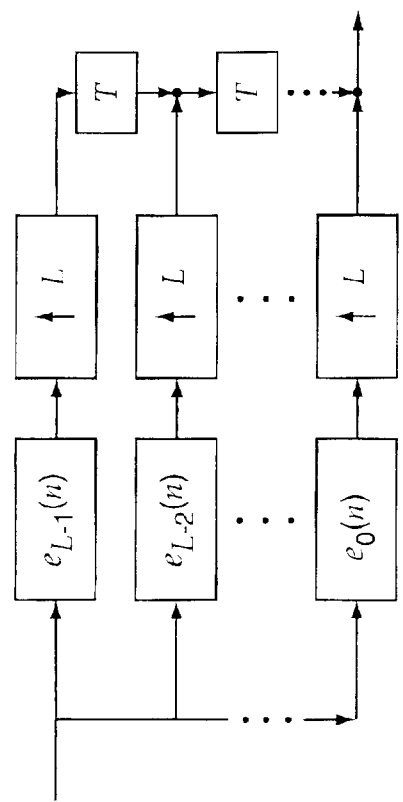
FIG. 7 is a representation of a time variant multi-rate interpolation filter.
Figure 8:
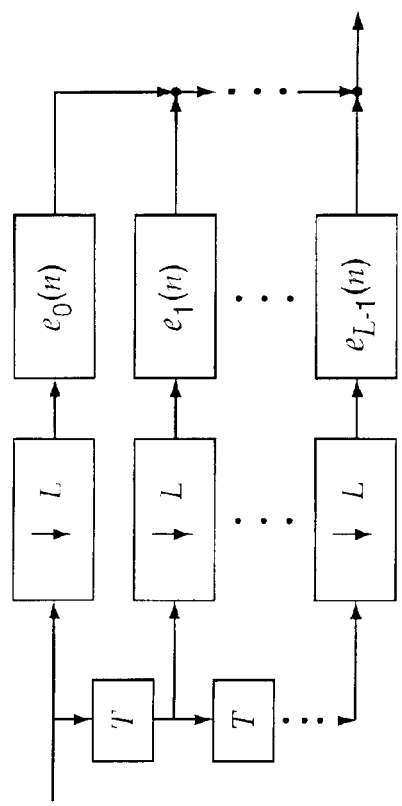
FIG. 8 is a representation of a time variant multi-rate decimation filter.

In contrast, the present invention, as implemented in FIG. 7, would create one combined time variant polyphase filter for each user, which requires 1024 complex words of memory for coefficients per user. The coefficients are pre-calculated once per slot resulting in 0.684 million CMACs per second per user. The filter realization requires 8 CMACs per chip-rate period, per user, per cancellation iteration for a total computational requirement of 0.988 billion CMACs per second. The result is functionally equivalent with a computational complexity reduction of 86% as compared to the conventional regeneration process. Accordingly, the present invention provides functionally equivalent results to previous regeneration techniques, while significantly reducing the complexity of the chip-rate regeneration process. Given that chip-rate regeneration accounts for 80–90% of the total computational requirement of chip-rate PIC, the invention potentially provides more than a threefold reduction in overall system requirements for PIC.

The invention has many possible applications, of which regeneration of signals in TDD MUD is only one such application. Those skilled in the art will recognize improvements and modifications to the preferred embodiments of the present invention. All such improvements and modifications are considered within the scope of the concepts disclosed herein and the claims that follow.

What is claimed is:

1. A method for filtering a signal comprising:
   a) calculating each filter coefficient for a combined time invariant finite impulse response (FIR) filter and a time variant FIR filter;
   b) storing each filter coefficient in a memory array in addressable groups corresponding to a filtering period; and
   c) filtering data to implement the combined time invariant FIR filter and time variant FIR filter using a polyphase decomposition of the filter coefficients to create an output signal.

2. The method of claim 1 wherein the time invariant FIR filter response provides filtering based on a channel estimate.

3. The method of claim 2 wherein the time variant FIR filter provides filtering based on at least one of the group consisting of spreading and scrambling.

4. The method of claim 1 wherein filter calculations occur at a lower sampling rate and the output signal is provided at a higher sampling rate.

5. The method of claim 1 wherein the data is downsampled prior to filtering such that filter calculations occur at a lower sampling rate.

6. The method of claim 1 wherein the coefficients for the combined time invariant FIR filter and time variant FIR filter are calculated to emulate a time variant FIR filter preceding a time variant FIR filter.

7. The method of claim 6 wherein $a_k(n)$ represents coefficients for the time variant FIR filter, $b_{m-k}(n)$ represents the coefficients for the time invariant FIR filter, $c_m(n)$ represents the coefficients for the combined time invariant FIR filter and time variant FIR filter and values for $c_m(n)$ are calculated as follows:

$$c_m(n) = \sum_{k=\max(0,m-N_f)}^{\min(m,N_v)} a_k(n-m+k)b_{m-k}$$

wherein $N_v$ represents an order of the time variant FIR filter and $N_f$ represents an order of the time invariant FIR filter.

8. The method of claim 7 wherein the memory array includes $T_{VARIATION}$ rows and $N_v+N_f+1$ columns and $T_{VARIATION}$ is the product of R and P wherein there are R sets of values for the time variant coefficients, $a_k(n)$, and the values of $a_k(n)$ change every P sample periods.

9. The method of claim 8 wherein the filtering step further comprises selecting each of the coefficients for the combined time invariant FIR filter and time variant FIR filter, $c_m(n)$, from the memory array using a common index.

10. The method of claim 9 wherein the memory index is initialized to a first row in the memory array and incremented one row each sample period.

11. The method of claim 1 wherein the coefficients for the combined time invariant FIR filter and time variant FIR filter are calculated to emulate a time variant FIR filter following a time variant FIR filter.

12. The method of claim 1 wherein $a_k(n)$ represents coefficients for the time variant FIR filter, $b_{m-k}(n)$ represents the coefficients for the time invariant FIR filter, $c_m(n)$ represents the coefficients for the combined time invariant FIR filter and the time variant FIR filter and values for $c_m(n)$ are calculated as follows:

$$c_m(n) = \sum_{k=\max(0,m-N_f)}^{\min(m,N_v)} a_k(n)b_{m-k}$$

wherein $N_v$ represents an order of the time variant FIR filter and $N_f$ represents an order of the time invariant FIR filter.

13. The method of claim 12 wherein the memory array includes R rows and $N_v+N_f+1$ columns wherein there are R sets of values for the time variant coefficients, $a_k(n)$, and the values of $a_k(n)$ change every P sample periods.

14. The method of claim 13 wherein the filtering step further comprises selecting each of the coefficients for the combined time invariant FIR filter and time variant FIR filter, $c_m(n)$, from the memory array using a common index.

15. The method of claim 14 wherein the memory index is initialized to a first row in the memory array and incremented one row each sample period.

16. The method of claim 1 further comprising:
   a) receiving an input signal over a select period, the input signal including a plurality of user signals;
   b) for each of the plurality of user signals, subtracting individual regenerated signals corresponding to all other of the plurality of user signals from the input signal to create an individual signal;
   c) demodulating each individual signal to provide a corresponding demodulated individual signal;
   d) processing each demodulated individual signal to determine symbol estimates for each symbol included therein; and
   e) creating the individual regenerated signals from the symbol estimates using the calculating, storing and filter steps.

17. A system comprising:
   a) receiving circuitry for receiving and downconverting a transmitted signal to provide a downconverted signal; and
   b) a baseband processor adapted to receive the downconverted signal and;
      i) calculate each filter coefficient for a combined time invariant finite impulse response (FIR) filter and time variant FIR filter;
      ii) store each filter coefficient in a memory array in addressable groups corresponding to a filtering period; and
      iii) filter data in the downconverted signal with the combined time invariant FIR filter and time variant FIR filter using a polyphase decomposition of the filter coefficients to create an output signal.

18. The system of claim 17 wherein the time invariant FIR filter response provides filtering based on a channel estimate.

19. The system of claim 17 wherein the time variant FIR filter provides filtering based on at least one of the group consisting of spreading and scrambling.

20. The system of claim 17 wherein filter calculations occur at a lower sampling rate and the output signal is provided at a higher sampling rate.

21. The system of claim 17 wherein the data is downsampled prior to filtering such that filter calculations occur at a lower sampling rate.

22. The system of claim 17 wherein the coefficients for the combined time invariant FIR filter and time variant FIR filter are calculated to emulate a time variant FIR filter preceding a time invariant FIR filter.

23. The system of claim 22 wherein $a_k(n)$ represents coefficients for the time variant FIR filter, $b_{m-k}(n)$ represents the coefficients for the time invariant FIR filter, $c_m(n)$ represents the coefficients for the combined time invariant FIR filter and time variant FIR filter and values for $c_m(n)$ are calculated as follows:

$$c_m(n) = \sum_{k=\max(0,m-N_f)}^{\min(m,N_v)} a_k(n-m+k) b_{m-k},$$

wherein $N_v$ represents an order of the time variant FIR filter and $N_f$ represents an order of the time invariant FIR filter.

24. The system of claim 23 wherein the memory array includes $T_{VARIATION}$ rows and $N_v + N_f + 1$ columns and $T_{VARIATION}$ is the product of R and P wherein there are R sets of values for the time variant coefficients, $a_k(n)$, and the values of $a_k(n)$ change every P sample periods.

25. The system of claim 24 wherein during filtering the baseband processor is further adapted to select each of the coefficients for the combined time invariant FIR filter and the time variant FIR filter, $c_m(n)$, are selected from the memory array using a common index.

26. The system of claim 25 wherein the common index is initialized to a first row in the memory array and incremented one row each sample period.

27. The system of claim 17 wherein the coefficients for the combined time invariant FIR filter and time variant FIR filter are calculated to emulate a time variant FIR filter following a time invariant FIR filter.

28. The system of claim 27 wherein $a_k(n)$ represents coefficients for the time variant FIR filter, $b_{m-k}(n)$ represents the coefficients for the time invariant FIR filter, $c_m(n)$ represents the coefficients for the combined time invariant FIR filter and time variant FIR filter and values for $c_m(n)$ are calculated as follows:

$$c_m(n) = \sum_{k=\max(0,m-N_f)}^{\min(m,N_v)} a_k(n) b_{m-k},$$

wherein $N_v$ represents an order of the time variant FIR filter and $N_f$ represents an order of the time invariant FIR filter.

29. The system of claim 28 wherein the memory array includes R rows and $N_v + N_f + 1$ columns wherein there are R sets of values for the time variant coefficients, $a_k(n)$, and the values of $a_k(n)$ change every P sample periods.

30. The system of claim 29 wherein during filtering the baseband processor is further adapted to select each of the coefficients for the combined time invariant FIR filter and time variant FIR filter, $c_m(n)$, are selected from the memory array using a common index.

31. The system of claim 30 wherein the common index is initialized to a first row in the memory array and incremented one row each sample period.

32. The system of claim 31 wherein the downconverted signal is received over a select period and includes a plurality of user signals and the baseband processor is further adapted to:
   a) for each user signal, subtract individual regenerated signals corresponding to all other user signals from the input signal to create an individual signal;
   b) demodulate each individual signal to provide a corresponding demodulated individual signal;
   c) process each demodulated individual signal to determine symbol estimates for each symbol included therein; and
   d) create the individual regenerated signals from the symbol estimates using the calculate, store and filter functions.

33. A system for filtering a signal comprising:
   a) means for calculating each filter coefficient for a combined time invariant finite impulse response (FIR) filter and time variant FIR filter wherein the time invariant FIR filter response provides filtering based on a channel estimate and the time variant FIR filter provides filtering based on at least one of the group consisting of spreading and scrambling;
   b) means for storing each filter coefficient in a memory array in addressable groups corresponding to a filtering period; and c) means for filtering symbols to implement the combined time invariant FIR filler and time variant FIR filter using a polyphase decomposition of the filter coefficients to create a regenerated signal wherein filter calculations occur at a lower sampling rate and the regenerated signal is provided at a higher sampling rate.

* * * * *